United States Patent
Ochi et al.

[11] Patent Number: 5,824,390
[45] Date of Patent: Oct. 20, 1998

[54] METHOD FOR PRODUCING RETROREFLECTIVE SHEETING USING A COUPLING AGENT

[75] Inventors: Katsura Ochi, Kashiwa; Osamu Tanaka, Hiratsuka; Masaki Yoshizawa, Sano, all of Japan

[73] Assignee: Nippon Carbide Kogyo Kabushiki Kaisha, Tokyo, Japan

[21] Appl. No.: 504,309

[22] Filed: Jul. 20, 1995

[30] Foreign Application Priority Data

Jul. 22, 1994 [JP] Japan .................................. 6-191218

[51] Int. Cl.$^6$ ........................... G02B 5/128; B32B 31/12
[52] U.S. Cl. .......................... 428/143; 428/149; 428/325; 428/204; 428/166; 428/142; 156/145; 156/230; 156/237; 156/241; 156/276; 156/298; 359/536; 359/541
[58] Field of Search ..................... 428/143, 149, 428/325, 204, 166, 142; 156/145, 230, 237, 241, 276, 298; 359/536, 541

[56] References Cited

U.S. PATENT DOCUMENTS

| | | |
|---|---|---|
| 3,867,178 | 2/1975 | Mitter et al. ................ 117/69 |
| 4,756,931 | 7/1988 | Giordano et al. ............ 427/163 |
| 5,139,875 | 8/1992 | Metzemacher et al. ....... 428/403 |
| 5,283,101 | 2/1994 | Li ............................... 428/141 |
| 5,411,768 | 5/1995 | Knell et al. ................. 427/386 |

FOREIGN PATENT DOCUMENTS

| | | |
|---|---|---|
| 40-7870 | 6/1961 | Japan . |
| 60-194405 | 10/1985 | Japan . |
| 61-13561 | 4/1986 | Japan . |
| 62-121043 | 6/1987 | Japan . |

Primary Examiner—William Watkins
Attorney, Agent, or Firm—Sherman & Shalloway

[57] ABSTRACT

The present invention provides a method for producing retroreflective sheeting useful for marking or the like of signs such as road signs and construction signs; number plates of vehicles such as motorcars and motorcycles; materials for safety such as clothes and life jackets; signboards, etc., and the method is a method for producing retroreflective sheeting, which comprises embedding glass beads substantially in a monolayer in a temporary support at least one surface of which is composed of a thermoplastic resin in such a manner that at least part of each bead is embedded in the thermoplastic resin; forming a vapor-deposited metal film on the surface in which the glass beads were embedded; superposing thereon a thermoformable support film; pressing the resultant superposed matter under heating to embed the vapor-deposited metal film portion of each of the glass beads in the support film; and peeling the temporary support from the superposed matter in such a manner that the glass beads remain in the support film, said method being characterized in that a thin film containing a coupling agent is previously formed on the vapor-deposited metal film of the temporary support in which the glass beads are embedded and on which the vapor-deposited metal film is then formed, and then the support film is superposed thereon.

17 Claims, 1 Drawing Sheet

METHOD FOR PRODUCING RETROREFLECTIVE SHEETING USING A COUPLING AGENT

BACKGROUND OF THE INVENTION

1. Field of Invention

The present invention relates to a method for producing retroreflective sheeting useful for marking or the like of signs such as road signs and construction signs; number plates of vehicles such as motorcars and motorcycles; materials for safety such as clothes and life jackets; signboards, etc.

2. Description of the Prior Art

Retroreflective sheeting which retroreflects light toward the light source have hitherto been well known, and are widely utilized in such utilization fields as mentioned above utilizing their retroreflectivity. Among them, encapsulated lense-type retroreflective sheeting, whose light-retroreflective performance is enhanced by utilizing the low refractive index of gas and forming a gaseous layer between a light-transmittable protective film and retroreflective glass beads, is finding yearly increasing utility because of their excellent light-retroreflective ability.

Figure 1:
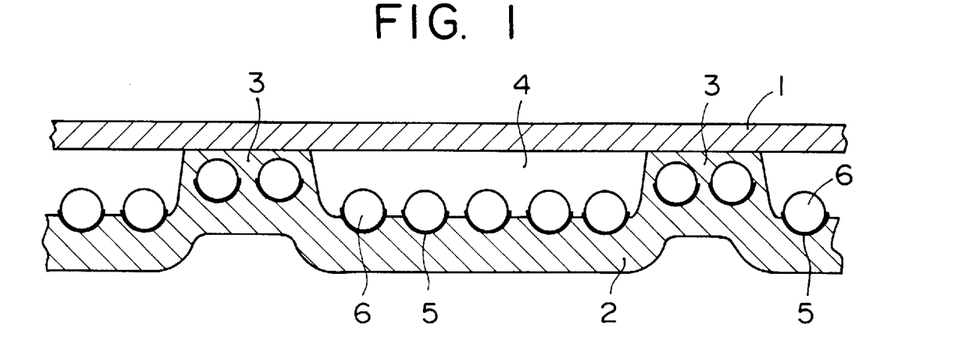
FIG. 1 is the cross section of encapsulated lens-type retroreflective sheeting.

Generally, the structure of encapsulated lense-type retroreflective sheeting is composed of, as shown in FIG. 1, a light-transmittable protective film (1) and a support film (2) facing each other through a narrow gaseous layer, and a continuous, linear binding wall (3) formed by partially, thermally fusing and deforming the support film for binding both of them, and retroreflective glass beads (6), whose almost lower hemispherical surface is covered with a vapor-deposited metal film (5), are embedded in the support film in a large number of sealed, small compartment cells (4) surrounded by the binding wall, in such a manner that they form a substantial monolayer and the non-reflecting part of the glass beads is exposed.

As to such encapsulated lense-type retroreflective sheeting, the height of its light-retroreflective ability is desired as the most important function, and, in addition, such good weather resistance that even when it is used in a severe condition such as outdoor use, their excellent retroreflective performance can be maintained over a long period of time, the vividness of the color of the retroreflective sheeting for heightening visibility, etc. are also required as important functions.

The lowering of retroreflective performance occurring when encapsulated lense-type retroreflective sheeting is used outdoors for a long period is caused, in almost all the cases, by that the sealed, small compartment cells are destroyed, and rainwater, etc. invade therein. Retroreflective performance is lowered, for example, by that the gastightness of the sealed, small compartment cells is lost, because of cracks of the protective film due to the repeats of the expansion and contraction of the gas in the sealed, small compartment cells accompanying the change of outdoor temperature, and the repeats of the expansion and contraction of the metal plate, etc. on which the retroreflective sheeting is stuck also accompanying the change of out-door temperature, etc.; adhesion destruction at the interface between the protective film and the binding wall; the destruction of the binding wall itself or the destruction of the support film itself, or the like, rainwater, etc. invade in the cells, and as a result, the refractive index condition in the cells, which is an important factor for the retroreflective performance, changes, or the vapor-deposited metal film, which is a light-reflecting film, etc. are deteriorated to lose the light reflective ability, etc.

Among them, the binding wall binding the protective film and the support film tend to be most easily influenced by distortion and most easily destroyed, because of their construction, and, in fact, many cases of the deterioration of retroreflective sheeting and the lowering of retroreflective performance occur due to the destruction of the binding wall. Therefore, for improving the weather resistance of retroreflective sheeting, it is most important to form a binding wall having excellent strength.

Various attempts have hitherto been made, for improving the strength of the binding wall, and, for example, it is proposed in Japanese Patent Publication No. 13561/1986 (=U.S. Pat. No. 4,025,159; GB-B-1,547,043) to heighten the strength of the binding wall by thermally fusing and deforming the support film to form binding wall (binding part tissue), and then irradiating the binding wall with a radiation to crosslink the binding wall, and a typical example of the production method is described.

The typical example of the method for producing encapsulated-type retroreflective sheeting, disclosed in Japanese Patent Publication No. 13561/1986, is as follows, as described in Example 1 therein.

First, a radiation-curable composition is applied onto a temporary support (composed of a polyethylene layer and paper) having glass beads embedded part of each of them in the polyethylene layer which is a thermoplastic polymer, and having vapor-deposited metallic aluminum on the top surface thereof, and dried to form a support layer. As illustrated in Example 10 of the said Japanese Patent Publication, it is also possible to previously form a support layer on a film such as a polyethylene terephthalate film, superpose it on the glass beads in the temporary support, and press the superposed matter. Then, a polyethylene terephthalate film having a pressure sensitive adhesive layer is laminated and stuck on the support layer, and then the temporary support is peeled to give a substrate sheet. A polymethyl methacrylate film, which will be a protective (covering) film, is superposed on the glass beads side of this substrate sheet, and the support layer is partially thermally fused and deformed to laminate and bind the protective film and the support layer as a binding wall (binding part) having network tissue. Then, the resultant sheeting is irradiated with a radiation to cure the binding part, whereby encapsulated-type (cellular) retroreflective sheeting is produced.

However, since, in the above-proposed method, no care is made on preventing the vapor-deposited metal film formed on the part other than the glass beads on the temporary support, from being transferred on the support film, the vapor-deposited metal film transferred from the temporary support remains on the support film surface between the glass beads, and therefore, many broken pieces of the vapor-deposited metal film remain in the binding wall obtained by thermally fusing and deforming this support film.

Thus, the above-proposed method has a defect that, since the vapor-deposited metal film remaining in the binding wall strikingly lowers the cohesion strength of the binding wall, adhesive strength between the protective film and the binding wall, etc., retroreflective sheeting having excellent weather resistance cannot be obtained. Further, there is also a problem that, since the vapor-deposited metal film remaining on the support film surface between the glass beads in the sealed, small compartment cells gives dullness to the hue of the retroreflective sheeting, the vividness of color of the retroreflective sheeting is lowered.

For improving the above defects, several attempts were also made for preventing the transfer of the vapor-deposited metal film, striking inhibiting the strength of the binding wall and giving a bad influence on the hue of the retroreflective sheeting. For example, a method of superposing a support film on the glass beads in the temporary support, and pressing the superposed matter, the method being characterized in that the pressing is conducted giving clearance so that the vapor-deposited metal film on the temporary support between the glass beads and the support film may not contact, is proposed in Japanese Laid-open Patent Publication No. 121043/1987 (=U.S. Pat. No. 4,897,136; EP-A-225,103).

However, as to this proposed method, it is very difficult to conduct the pressing so that the glass beads may be sufficiently embedded in the support film, while enough clearance is maintained. Further, this proposed method has further defects that when the embedding of the glass beads in the support film is insufficient because of the change of the temperature condition and the pressure condition at the time of pressing, a large number of glass beads remain on the temporary support at the time of peeling the temporary support, and thereby strikingly poor appearance and poor retroreflective performance are caused, and on the other hand, in the case of excessive embedding, the support film and the vapor-deposited metal film are contacted partially or totally, and as a result, the vapor-deposited metal film is partially or totally transferred on the support film, and the weather resistance, hue, etc. of the resultant retroreflective sheeting are badly influenced thereby.

Further, if, in a production step for encapsulated lens-type retroreflective sheeting, glass beads are embedded in the thermoplastic polymer layer of the temporary support while closely arranged so as to become a state of closest packing, the transfer of the vapor-deposited metal film can be avoided, but this is substantially impossible in an actual production step. The area on the temporary support covered with glass beads embedded is usually about 65 to 80% of the whole temporary support surface (becoming about 90% in the case of closest packing), and their distribution state is illustrated as a model in FIG. 2 and FIG. 3.

Figure 2:
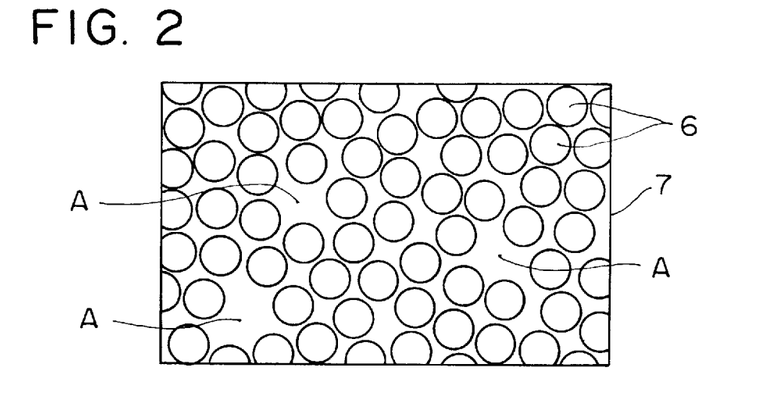
FIG. 2 is a plan view showing the distribution model of the glass beads with which the temporary support is covered.

FIG. 2 is a plan view showing the distribution model of glass beads (6) with which the temporary support (7) is covered, and as shown therein, glass beads are not uniformly distributed on the temporary support, and regions A where they do not exist and other regions where glass beads are comparatively closely arranged exist thereon.

Figure 3:
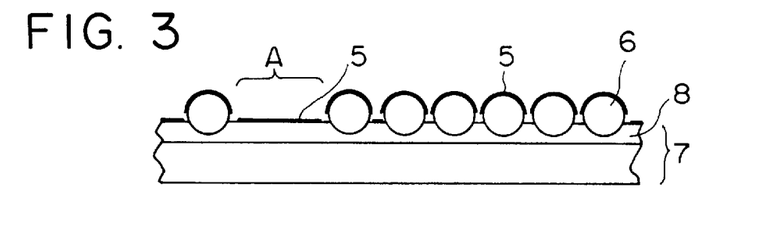
FIG. 3 is a model drawing showing the cross section of FIG. 2.

FIG. 3 is a model drawing showing the cross section of FIG. 2, glass beads (6) are embedded in the thermoplastic polymer layer (8) of the temporary support (7), and a vapor-deposited metal film (5) is formed on the about hemispherical surface of each of the glass beads and the temporary support. As is the case with FIG. 2, regions A where glass beads do not exist and other regions where glass beads are comparatively closely arranged exist on the temporary support.

Figure 4:
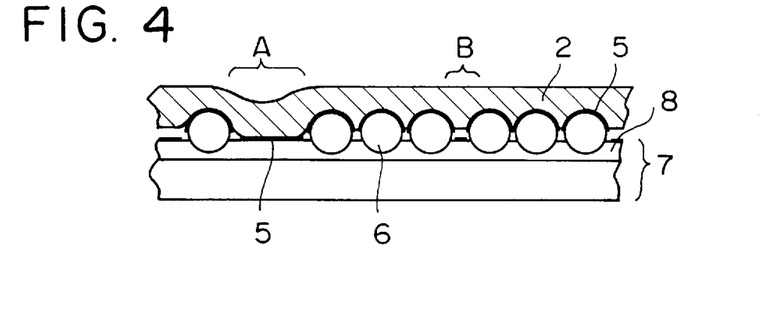
FIG. 4 is a model drawing showing the cross section of the laminate formed by superposing the support film on the glass beads of the temporary support, and heating and pressing the resultant superposed matter.

FIG. 4 is a model drawing showing the cross section of a laminate formed by superposing a support film (2) on glass beads (6) of the temporary support, and heating and pressing the resultant superposed matter.

As apparent from FIG. 4, even if the pressing is conducted maintaining some clearance so that the support film (2) may not contact with the vapor-deposited metal film (5) on the temporary support, the support film (2), in the region A, easily contacts with the vapor-deposited metal film (5) on the temporary support, and there is a large possibility that when the temporary support is peeled, the vapor-deposited metal film at the part of the region A is transferred onto the support film.

It is conducted, in actual industrial production of encapsulated lense-type retroreflective sheeting, to continuously produce a laminate from a long temporary support and a support film, once take it up in a roll state and temporarily store it, and then provide it for steps of or after the peeling of the temporary support. In this occasion, by influence of pressure, etc. of the take up roll (particularly, at the part nearer to the core of the roll), contact between the support film and the vapor-deposited metal film occurs even at parts where clearance between glass beads is comparatively narrow (for example, region B in FIG. 4), and as a result, a large amount of the vapor-deposited metal film is transferred onto the support film side, and becomes a cause of increase of inferior products occurrence ratio.

Therefore, it is actually difficult to efficiently obtain a support film free of transfer of the vapor-deposited metal film by the method disclosed in Japanese Laid-open Patent Publication No. 121043/1987 (=U.S. Pat. No. 4,897,136; EP-A-225,103) comprising superposing and heat-pressing the support film and the temporary support, while maintaining clearance.

In order to repair such defects, there is proposed in Japanese Laid-open Patent Publication No. 194405/1985 (=U.S. Pat. No. 4,653,854; GB-A-2,156,274) another method so as to perfectly avoid the contact between the support film and the vapor-deposited metal film, in which method there is further provided a thin layer of polymer having comparatively good adhesive strength to both the temporary support and the vapor-deposited metal film but having comparatively weak adhesive strength to the support film, on the surface of the temporary support on which glass beads are embedded and on which a vapor-deposited metal film is formed.

It is possible without fail to perfectly avoid contact between the support film and the vapor-deposited metal film, by using this method. However, in general, a polymer capable of forming polymer thin layer has better adhesive strength to the support film containing the same or different kind of a polymer than to the vapor-deposited metal film on the temporary support, and therefore, it is actually extremely difficult to select a polymer having comparatively good adhesive strength to the temporary support and the vapor-deposited metal film but having comparatively weak adhesive strength to the support film, suggested in the above proposal. Any specific example of such polymers is not given at all in Japanese Laid-open Patent Publication No. 194405/1985 (=U.S. Pat. No. 4,653,854; GB-A-2,156,274).

SUMMARY OF THE INVENTION

The present inventors formed polymer thin layers using several polymers, and checked the transfer property of the vapor-deposited metal film, but there is a case where the polymer thin layer is transferred, with attachment of the vapor-deposited metal film, onto the support film side, and thus the above-proposed method is yet insufficient as a method for preventing the vapor-deposited metal film from being transferred onto the support film.

The main object of this invention is to develop a method for surely preventing the vapor-deposited metal film on the temporary support between the glass beads from being transferred onto the support film, and thereby provide a method for producing superb retroreflective sheeting excellent in long-term weather resistance and having vivid color, particularly encapsulated lense-type retroreflective sheeting wherein vapor-deposited metal film pieces are not remaining in the binding wall and on the support film between the glass beads in the sealed, small compartment cells.

The present inventors had made various, sequential researches into a method for producing retroreflective sheeting meeting the above objects, and as a result, they now found that excellent retroreflective sheeting free of the defects of the above prior art can be obtained by previously applying liquid matter containing a coupling agent on the vapor-deposited metal film on the temporary support where glass beads are embedded and a vapor-deposited metal film is formed, and drying the applied liquid matter to form a thin film containing the coupling agent, and completed the present invention.

Thus, according to the invention is provided a method for producing retroreflective sheeting, which comprises embedding glass beads substantially in a monolayer in a temporary support at least one surface of which is composed of a thermoplastic resin in such a manner that at least part of each bead is embedded in the thermoplastic resin; forming a vapor-deposited metal film on the surface in which the glass beads were embedded; superposing thereon a thermoformable support film; pressing the resultant superposed matter under heating to embed the vapor-deposited metal film portion of each of the glass beads in the support film; and peeling the temporary support from the superposed matter in such a manner that the glass beads remain in the support film; and, if necessary, superposing a light-transmittable protective film on the exposed glass beads of the resultant support film in which the glass beads are embedded and partially thermally deforming the support film to form a large number of sealed, small compartment cells, between the support film and the light-transmittable protective film, surrounded by a continuous, linear wall which binds both these films, said method being characterized in that a thin film containing a coupling agent is previously formed on the vapor-deposited metal film on the temporary support in which the glass beads are embedded and on which the vapor-deposited metal film is then formed, and then the support film is superposed thereon.

The method for producing retroreflective sheeting according to the invention is further detailedly described below.

DESCRIPTION OF THE DRAWINGS

The attached drawings are briefly described below.

DESCRIPTION OF THE PREFERRED EMBODIMENTS

The method of the invention has its large characteristic in the point that a coupling agent-containing thin film is previously formed on the temporary support where glass beads are embedded and a vapor-deposited metal film is formed on the whole top surface, in such a manner that the vapor-deposited metal film is covered therewith, and thereby, the vapor-deposited metal film is made not to be transferred onto the support film side, even if, thereafter, the support film and the vapor-deposited metal film on the temporary support contact.

The coupling agent to be used in this invention can be a usual coupling agent generally used as a modifier of interface, for example, for chemically bonding together an inorganic material and an organic material, or different organic materials each other, and includes, for example, silane coupling agents, titanate coupling agents, aluminum coupling agents and zircoaluminum coupling agents. More specifically, those exemplified below can be used.

(1) Silane coupling agents:

Compounds represented by the general formula wherein $X^1$ represents a hydrolyzable group [for example, an alkoxy group (e.g., a methoxy group, an ethoxy group, a 2-methoxyethoxy group, a 2-methoxy-2-ethoxyethoxy group, etc.), an acetoxy group, a chlorine atom, etc., a methoxy group is particularly preferred], $Y^1$ represents an organic functional group reacting with an organic matrix [for example, a vinyl group, a (meth) acryloyloxy group, an epoxy-containing group (e.g., a glycidoxy group, an epoxycyclohexyl group, etc.), a mercapto group, an amino group, an ureido group, a chlorine atom, an imidazolyl group, a cyano group, etc., preferably a (meth)acryloyloxy group or an epoxy-containing group], $Z^1$ represents a nonhydrolyzable group [for example, a methyl group, etc.], $R^1$ represents a single bond or an alkylene group such as an ethylene group or an n-propylene group, preferably an n-propylene group, and n is 2 or 3, for example, 3-chloropropyltrimethoxysilane, 3-methacryloyloxypropyltrimethoxysilane, 3-glycidoxypropyltrimethoxysilane, 3-mercaptopropyltrimethoxysilane, 3-aminopropyltrimethoxysilane, N-methyl-3-aminopropyltrimethoxysilane, N-(2-aminoethyl)-3-aminopropyltrimethoxysilane, N-[2-(N-2-aminoethyl) aminoethyl]-3-aminopropyltrimethoxysilane, 3-ureidopropyltrimethoxysilane, N-phenyl-3-aminopropyltrimethoxysilane, 3-(4,5-dihydroimidazolyl)propyltrimethoxysilane, 3-aminopropyltris(2-methoxy-2-ethoxyethoxy)silane, N-(2-aminoethyl)-3-aminopropylmethyldimethoxysilane, 3-chloropropylmethyldimethoxysilane, 3-methacryloyloxypropylmethyldimethoxysilane, 3-mercaptopropylmethyldimethoxysilane, 3-glycidoxypropylmethyldimethoxysilane, 3-chloropropylmethyldiethoxysilane, 3-aminopropylmethyldiethoxysilane, 2-(3,4-epoxycyclohexyl)ethyltrimethoxysilane, vinyltrimethoxysilane, vinyltriethoxysilane, 3-chloropropyltriethoxysilane, 3-mercaptopropyltriethoxysilane, 3-aminopropyltriethoxysilane, 3-ureidopropyltriethoxysilane, 3-cyanopropyltriethoxysilane, vinyltris(2-methoxyethoxy)silane, vinyltriacetoxysilane, vinyltrichlorosilane, 3-chloropropylmethyldichlorosilane, octadecyl[3-(trimethoxysilyl)propyl] ammonium chloride and N-[2-(N-vinylbenzyl)aminoethyl]-3-aminopropyltrimethoxysilane hydrochloride, etc.

(2) Titanate coupling agents:
2-1) Compounds represented by the general formula wherein $X^2$ represents a hydrolyzable group [for example, an alkoxy group (e.g., a methoxy group, an ethoxy group, an n-propoxy group, an isopropoxy group, an n-butoxy group, an isobutoxy group, a sec-butoxy group, a tert-butoxy group, etc.), an acetoxy group, etc., or when p is 2, a group wherein two $X^2$ groups are combined (e.g., an oxyacetoxy group, an oxyethoxy group, etc.), preferably, an isopropoxy group, an oxyacetoxy group, an oxyethoxy group, etc., particularly preferably, an isopropoxy group], $Y^2$ represents an organic group having affinity for or reactivity with an organic matrix [for example, an acyloxy group (e.g., a (meth)acryloyloxy group, an octanoyloxy group, a lauroyloxy group, an oleoyloxy group, a stearoyloxy group, an isostearoyloxy group, etc.), an aryloxy group (a p-cumylphenoxy group, etc.), an arylsulfonyloxy group (a dodecylbenzenesulfonyloxy group, etc.), an alkylphosphonoxy group (e.g., a dioctylphosphonoxy group, a dioctylpyrophosphonoxy group, etc.), an amino group-containing group (e.g., a 2-N-(2-aminoethyl)aminoethoxy group), etc.], and p is 0.5 to 2, for example, isopropyl trioctanoyl titanate, isopropyl triisostearoyl titanate, isopropyl diacryloyl isostearoyl titanate, isopropyl dimethacryloyl isostearoyl titanate, isopropyl tris (dodecylbenzenesulfonyl) titanate, isopropyl tris(p-cumylphenyl) titanate, isopropyl tris[2-N-(2-aminoethyl) aminoethyl] titanate, isopropyl tris(dioctylphosphono) titanate, isopropyl tris(dioctylpyrophosphono) titanate, bis (dioctylpyrophosphono) carbonylmethylene titanate, bis(p-cumylphenyl) carbonylmethylene titanate, diisostearoyl ethylene titanate, bis(dioctylpyrophosphono) ethylene titanate, etc.
2—2) Compounds represented by the general formula wherein $X^3$ represents a hydrolyzable group [for example, an alkoxy group or substituted alkoxy group such as a methoxy group, an ethoxy group, an n-propoxy-group, an isopropoxy group, an n-butoxy group, an isobutoxy group, a sec-butoxy group, a tert-butoxy group, a 2-methoxyethoxy group, a 2-ethoxyethoxy group, a 2-butoxyethoxy group, a 3-methoxypropoxy group, a 2-methoxy-2-ethoxyethoxy group or a 2-methoxy-2-ethoxy-2-ethoxy-2-ethoxy group], $Y^3$ represents an organic group having affinity for or reactivity with an organic matrix [for example, an alkoxy group or substituted alkoxy group (e.g., an n-hexyloxy group, a 2-hexyloxy group, an n-octyloxy group, an isooctyloxy group, a tridecyloxy group, a stearyloxy group, a 2,2-diallyloxymethyl-1-butoxy group, etc.), an aryloxy group (e.g., a phenoxy group, a methoxyphenoxy group, etc.), a haloalkoxy group or haloaryloxy group (e.g., a bromomethoxy group, a chloroethoxy group, a chlorophenoxy group, etc.), etc.], $Z^2$ represents, for example, an alkoxy group (e.g., a methoxy group, an ethoxy group, an n-propoxy group, an isopropoxy group, an n-butoxy group, an isobutoxy group, a sec-butoxy group, a tert-butoxy group, an n-hexyloxy group, an n-octyloxy group, an isooctyloxy group, a decyloxy group, a lauryloxy group, a tridecyloxy group, a stearyloxy group, etc.), a substituted alkoxy group (e.g., a 2-methoxyethoxy group, a 2-ethoxyethoxy group, a 2-butoxyethoxy group, a 3-methoxypropoxy group, a 2-methoxybutoxy group, a 2-methoxy-2-ethoxyethoxy group or a 2-methoxy-2-ethoxy-2-ethoxyethoxy group, etc.), an aryloxy group (e.g., a phenoxy group, a tolyloxy group, a xylyloxy group, cresyloxy group, a cumylphenoxy group, a methoxyphenoxy group, etc.), an aralkyloxy group (a benzyloxy group, etc.), a haloalkoxy group or haloaryloxy group (e.g., a bromomethoxy group, a chloroethoxy group, a 3-chloropropoxy group, a 2-chlorotridecyloxy group, a chlorophenoxy group, 2,4-dibromophenoxy group, etc.), etc., and m is 0 to 4, for example, tetramethyl bis(diphenyl phosphite)titanate, tetraethyl bis(dibenzyl phosphite)titanate, tetraisopropyl bis (dioctyl phosphite)titanate, tetraisopropyl bis(dilauryl phosphite)titanate, tetraisopropyl bis[di(methoxyphenyl) phosphite]titanate, tetraisopropyl bis[di(cumylphenyl) phosphite]titanate, tetraisobutyl bis(ditolyl phosphite) titanate, tetratert-butyl bis(dixylyl phosphite)titanate, tetrahexyl bis(dilauryl phosphite)titanate, tetraoctyl bis(dioctyl phosphite)titanate, tetraoctyl bis(dilauryl phosphite)titanate, tetraoctyl bis(ditridecyl phosphite)titanate, tetraoctyl bis (dicresyl phosphite)titanate, tetra(3-methoxypropyl) bis (dioctyl phosphite)titanate, tetra(2-methoxy-2-ethoxyethyl) bis[di(2-chlorotridecyl) phosphiteltitanate, tetra(2-methoxy-2-ethoxy-2ethoxyethyl) bis(dicresylphosphite) titanate, tetra (2-butoxyethyl) bis(di-3-chloropropyl phosphite)titanate, tetra[(2,2-diallyloxymethyl)butyl] bis(ditridecyl phosphite) titanate, methyl hexyl(2-ethoxyethyl)isooctyl bis[(2,4-dibromophenyl) n-hexyl phosphite]titanate, tetraphenyl bis (dibutyl phosphite)titanate, dimethyl diphenyl bis (diisopropyl phosphite)titanate, tetra(methoxyphenyl) bis (dibutyl phosphite)titanate, tetra(chloroethyl) bis(octyl decyl phosphite)titanate, tetra(chlorophenyl) bis(dilauryl phosphite]titanate, tetra(bromomethyl) bis[(di (methoxybutyl) phosphite]titanate, etc.
(3) Aluminum coupling agents:
Compounds represented by the general formula wherein $X^4$ represents a hydroxyl group or a hydrolyzable group [for example, an alkoxy group such as a methoxy group, an ethoxy group, an n-propoxy group, an isopropoxy group, an n-butoxy group, an isobutoxy group, a sec-butoxy group or a tert-butoxy group, etc.], $Y^4$ represents an organic group having affinity for or reactivity with an organic matrix [for example, an acyloxy group (e.g., a (meth)acryloyloxy group, an acetoacetoxy group, an octanoyloxy group, a lauroyloxy group, an oleoyloxy group, a stearoyloxy group, an isostearoyloxy group, a 1-amino-(N-lauroyloxy)propionyloxy group, etc.), an alkoxysulfonyloxy group (e.g., lauryloxysulfonyloxy group, etc.), an alkylsulfonyloxy group (e.g., a methylsulfonyloxy group, etc.), an arylsulfonyloxy group (e.g., a dodecylbenzenesulfonyloxy group, etc.), an alkylphosphonoxy group (e.g., a dibutylphosphonoxy group, a dioctylphosphonoxy group, a dioctylpyrophosphonoxy group, etc.), etc.], $Z^3$ represents, for example, an alkyl group (a methyl group etc.), an aryl group (a phenyl group etc.), etc.,

$Z^4$ represents, for example, an alkyl group (a methyl group etc.), an alkoxy group or alkenyloxy group (e.g., an ethoxy group, a lauryloxy group, a stearyloxy group, an oleyloxy group, etc.), a substituted amino group (e.g., an N-stearylamino group, etc.), etc., and q is 0.5 to 2, for example, diisopropylate aluminum oleylacetoacetate, isopropylate acrylate aluminum oleylacetoacetate, isopropylate acetoactate aluminum oleylacetoacetate, isopropylate dibutyl phosphate aluminum oleylacetoacetate, isopropylate dibutyl pyrophosphate aluminum leylacetoacetate, isopropylate dodecylbenzene sulfonate luminum oleylacetoacetate, isopropyl ate lauryl sulfate luminum oleylacetoacetate, etc.

(4) Zircoaluminate coupling agents:

Compounds represented by the general formula wherein $Y^5$ represents an organic group having affinity for or reactivity with an organic matrix [for example, an amino group, a carboxyl group, a (meth)acryloyloxy group, 1-methylvinyl group, a mercapto group, an acyloxy group, a dodecyl group, etc.], and $R^2$ represents a single bond or an alkylene group of $C_1$ to $C_{18}$ [for example, an ethylene group, an n-butylene group, an n-dodecylene group, etc.], for example, 2-aminopropionyl zircoaluminate, 2-carboxypropionyl zircoaluminate, myristoyl zircoaluminate, methacryloyl zircoaluminate, 2-mercaptopropionyl zircoaluminate, etc.

These coupling agents can be used alone or in combination of two or more. Silane coupling agents are particularly preferred.

Formation of a coupling agent-containing thin film on the vapor-deposited metal film on the temporary support is not particularly limited, and can be conducted according to a method known per se, but, in general, a method of applying liquid matter containing a coupling agent can be used.

As to the liquid matter containing a coupling agent, the coupling agent can be used as such, when the coupling agent itself is liquid matter having film formation ability, or can be used after being dissolved or dispersed in an appropriate solvent. It is preferred to use the coupling agent and a resin together because the resultant coupling agent-containing thin film usually becomes tougher.

As usable resins therefor, there can be mentioned those having good weather resistance, for example, acrylic resins, polyester resins, polyurethane resins, fluorine-containing resins, etc., and these can be used alone or as a blend of two or more.

The use amount of these resins can be varied according to the kind of coupling agent, the kind of resin, etc., but when it is desired to give toughness to coupling agent-containing thin film to be formed, it is generally suitable to use the resin at an amount in the range of 0.01 to 20 weight parts, preferably 0.05 to 15 weight parts, further preferably 0.1 to 12 weight parts, most preferably 10 weight parts or less based on 100 weight parts of the coupling agent.

The viscosity characteristic of the coupling agent-containing liquid matter is not particularly limited so long as it is liquid capable of being applied, but it is, usually, suitable to adjust its viscosity using a diluent such as a-solvent appropriately, for making the control of the thickness of thin film to be formed easy, so that its viscosity at 23° C. may be in the range of 1 to 1,000 cP, preferably 1 to 500 cP.

The coating method for the above coupling agent-containing liquid matter is also not particularly limited, and various methods known per se, for example, coating methods such as spray coating methods, gravure coating methods, bar coating methods, roll coating methods can be adopted.

When a volatile substance such as a solvent is used for preparation of the liquid matter, a usual operation such as evaporating the volatile substance to dry the coating film can be added after the coating.

Further, the film formed can be subjected to heating treatment at temperatures, for example up to about 100° C., depending on the used coupling agent.

The thickness of the thus formed coupling agent-containing thin film is not particularly limited, and can widely be varied in accordance with the kind and amount of the coupling agent or resin used together, etc., but it is usually preferred in view of the assurance of thin film forming, easiness of operations, etc. to make the thickness, on average, in the range of about 0.01 to about 5 $\mu$m, more preferably about 0.05 to about 3 $\mu$m, particularly 0.1 to about 1 $\mu$m.

The production of the retroreflective sheeting of the invention can be conducted using materials and methods so far known, for example, materials and methods disclosed in Japanese Patent Publication No. 7870/1965 (=U.S. Pat. No. 3,190,178; GB-B-1,017,060), Japanese Patent Publication No. 13561/1986 (=U.S. Pat. No. 4,025,159; GB-B-1,547,043), Japanese Laid-open Patent Publication No. 194405/1985 (=U.S. Pat. No. 4,653,854; GB-A-2,156,274), etc., except that after glass beads were partially embedded as a substantial monolayer in a temporary support at least one surface of which was composed of a thermoplastic resin, and a vapor-deposited metal film was formed on the surface where the glass beads are embedded, according to usual methods, respectively, a coupling agent-containing thin film is formed on the vapor-deposited metal film, as described above, according to the invention.

An example thereof is described below.

First, glass beads having a refractive index of the order of about 1.7 to about 2.0 and an average particle size of the order of 20 to 150 $\mu$m are embedded in a temporary support such as process paper having a thermoplastic resin such as a polyethylene resin as a surface layer in such a manner that about ⅓ to about ½ of the diameter of the glass beads is embedded in the thermoplastic resin surface layer, and a metal such as aluminum is vacuum-deposited on the exposed glass beads side of the temporary support to cover the about hemispherical surface of the glass beads with the vapor-deposited metal film. Then, liquid matter containing a coupling agent is applied onto the vapor-deposited metal film surface, and, if necessary, dried to form a coupling agent-containing thin film. Then, a support film formed on a process base material such as a polyethylene terephthalate process film, and the temporary support are superposed in such a manner that the support film and the glass beads on which the vapor-deposited metal film and the coupling agent-containing thin film were formed face each other, and the resultant superposed matter is pressed under heating until about ½ to about ⅓ of the diameter of the glass beads is embedded in the support film. It causes no hindrance if the support film is contacted with the coupling agent-containing thin film on the temporary support, but it is of course possible to conduct the pressing maintaining some clearance so as not to contact them.

Then, the temporary support is peeled, a light-transmittable protective film such as an acrylic film is superposed on the exposed glass beads surface on the support film, and the support film is partially deformed under heating using, for example, an embossing roll having continuous, linear projections to bind the protective film and the support film through the resultant continuous, linear binding wall.

As stated above, the invention provides a method for producing retroreflective sheeting, which comprises partially embedding glass beads, so as to be substantially a monolayer, in a temporary support at least one surface of which is composed of a thermoplastic resin, forming a vapor-deposited metal film on the surface where the glass beads were embedded, and then forming a coupling agent-containing thin film on the vapor-deposited metal film, whereby even if the support film and the vapor-deposited metal film on the temporary support are contacted, transfer of the vapor-deposited metal film onto the support film can be prevented, and thereby retroreflective sheeting excellent in adhesive strength between the protective film and the binding wall, and vividness of color, etc., and capable of maintaining excellent retroreflective performance for a long period can be produced without requiring complicated operation steps therefor.

The invention is further specifically described below according to examples and comparative examples.

EXAMPLE 1

A temporary support obtained by laminating polyethylene having a softening temperature of about 105° C. on paper was heated to about 105° C., glass beads having an average particle size of about 65 μm and a refractive index of about 1.91 were dispersed thereon uniformly and closely in a monolayer, and pressing was applied thereon using a nip roll to embed the glass beads in the polyethylene by about ⅓ of their diameter.

Thereafter, aluminum was vacuum-deposited on the side of the temporary support where the glass beads were exposed to form a vapor-deposited metal film about 0.1 μm thick on almost the half spherical surface of the glass beads.

Then, silane coupling agent liquid matter having a viscosity at 23° C. of about 2 cP (*) (produced by Toray Dow Corning Silicone Co., Ltd, trade name SZ6030) was applied on the vapor-deposited metal film on the temporary support where the vapor-deposited metal film was formed to form a coupling agent-containing thin film about 0.3 μm thick.

(*) main component: 3-methacryloxypropyl-trimethoxysilane

Then, the surface of a polyethylene terephthalate film of 20 μm thick on which peeling treatment had been made was coated with a composition comprising 100 weight parts of an acrylic resin solution having a solid content of about 50% by weight (produced by Tokushu Shikiryo Kogyo Co., Ltd., trade name ST-700) and 14.2 weight parts of a hexamethylene diisocyanate type crosslinking agent having a solid content of about 75% by weight, and the solvent was removed to give film-like matter about 30 μm thick. Thereon was applied a dispersion obtained by mixing under stirring 167 weight parts of an acrylic resin solution having a solid content of about 30% by weight (produced by Nippon Carbide Industries Co., Inc., trade name KP-1684A), 125 weight parts of an acrylic resin solution having a solid content of about 40% by weight (produced by Nippon Carbide Industries Co., Inc., trade name KP-1703A), 10 weight parts of cellulose acetate butyrate, 50 weight parts of rutile-type titanium dioxide and 30 weight parts of methyl isobutyl ketone, and the solvent was removed to give a support film having a total thickness of about 110 μm.

This support film was superposed on the previously made glass beads on the temporary support on which beads the vapor-deposited metal film and the coupling agent-containing thin film were formed, and the superposed matter was pressed at a linear pressure of 900 kg/m under heating to 70° C. to embed about ⅓ of the glass beads in the support film.

The resultant laminate sheet was wound up by about 500 m on a paper tube having an inner diameter of about 75 mm and an outer diameter of about 95 mm at a winding tension of 40 kg/m, and, then, the sheet was left alone at room temperature for 20 days so that the crosslinking reaction of the support film might be substantially completed, and, thereafter, the sheet was unwound. Then, the polyethylene laminate paper, i.e., the temporary support, was peeled off so that the glass beads might be transferred to the support film. The transfer ratio of the vapor-deposited metal film onto the resultant support film in which the glass beads were embedded was as shown in the later-described Table 1.

Then, a non-oriented acrylic film having a thickness of 75 μm and a whole light transmittance of about 93% was superposed on the support film on which the glass beads were transferred in such a manner that the glass beads and the acrylic film faced each other, and while the resultant superposed matter was passed through between a metal roll having network projections having a line width of about 0.3 mm and a surface temperature of about 190° C. and a rubber roll having a surface temperature of about 60° C. in such a manner that the acrylic film side was contacted with the rubber roll, the metal roll was pressed on the peeling-treated polyethylene terephthalate film side to conduct partial thermal fusion deforming.

The peeling-treated polyethylene terephthalate film was removed from the resultant thermal fusion deforming matter, and an acrylic pressure sensitive adhesive (produced by Nippon Carbide Industries Co., Inc., trade name KP-997) about 40 μm thick formed on a silicone-treated polyethylene terephthalate peeling film about 75 μm thick was laminated on and stuck to the resultant thermal fusion deforming matter in such a manner that the support film and the pressure sensitive adhesive were contacted, whereby retroreflective sheeting was produced.

The performance of the resultant encapsulated lens-type retroreflective sheeting is as shown in the later-described Table 1, and the retroreflective sheeting produced by the production method of the invention was excellent in vividness of color, and, even in the severe weathering test, exhibited only a low lowering ratio of retroreflective performance, was almost free of the peeling of the protective film, and thus had excellent characteristics.

EXAMPLE 2

Retroreflective sheeting was produced in all the same manner as in Example 1 except that liquid matter having a viscosity at 23° C. of about 1.5 cP produced by mixing 17 weight parts of the same silane coupling agent as used in Example 1 (trade name SZ6030) with 1 weight part of an acrylic resin solution having a solid content of about 1% by weight (an ethyl acetate solution of an acrylic copolymer having a weight average molecular weight of about 300,000 obtained by copolymerizing 54% by weight of ethyl acrylate with 46% by weight of methyl methacrylate), was applied, and a coupling agent-containing thin film was formed by drying of 3 minutes at 90° C.

The transfer ratio of the vapor-deposited metal film onto the resultant support film and the performance of the obtained encapsulated lens-type retroreflective sheeting were as shown in the later-described Table 1, and the retroreflective sheeting produced by the production method of the invention was excellent in vividness of color, and, even in the severe weathering test, exhibited only a low lowering ratio of retroreflective performance, was almost free of the peeling of the protective film, and thus had excellent characteristics.

EXAMPLE 3

Retroreflective sheeting was produced in all the same manner as in Example 2 except that aluminum coupling agent liquid matter (*) (produced by AJINOMOTO CO., INC., trade name Plenact AL-M) was used in place of the silane coupling agent.

(*) Main component: acetoalkoxy aluminum diisopropylate

The performance of the resultant encapsulated lens-type retroreflective sheeting is as shown in the later-described Table 1, and the retroreflective sheeting produced by the production method of the invention was excellent in vividness of color, and, even in the severe weathering test, exhibited only a low lowering ratio of retroreflective performance, was almost free of the peeling of the protective film, and thus had excellent characteristics.

EXAMPLE 4

Retroreflective sheeting was produced in all the same manner as in Example 2 except that titanate coupling agent liquid matter having a viscosity at 23° C. of about 20 cP (*) (produced by AJINOMOTO CO., INC., trade name Plenact KR46B) was used in place of the silane coupling agent.

(*) Main component: tetraoctyl bis(ditridecyl phosphite) titanate $(C_8H_{17}-O)_4Ti[P(OC_{13}H_{27})_2OH]_2$ The transfer ratio of the vapor-deposited metal film onto the resultant support film and the performance of the obtained encapsulated lens-type retroreflective sheeting were as shown in the later-described Table 1, and the retroreflective sheeting produced by the production method of the invention was excellent in vividness of color, and, even in the severe weathering test, exhibited only a low lowering ratio of retroreflective performance, was almost free of the peeling of the protective film, and thus had excellent characteristics.

EXAMPLE 5

Retroreflective sheeting was produced in all the same manner as in Example 1 except that a coupling agent-containing thin film was formed in the same manner as in Example 2; the acrylic resin components for the support film of Example 1 were changed to 100 weight parts of an acrylic resin solution having a solid content of about 50% by weight (produced by Tokushu Shikiryo Kogyo Co., Ltd., trade name ST-700) and 14.2 weight parts of a hexamethylene diisocyanate type crosslinking agent having a solid content of about 75% by weight, and 100 weight parts of an acrylic resin solution having a solid content of about 50% by weight (produced by Nippon Carbide Industries Co., Inc., trade name KP-1821A), 10 weight parts of cellulose acetate butyrate, 15 weight parts of rutile-type titanium dioxide and 10 weight parts of a hexamethylene diisocyanate type crosslinking agent having a solid content of about 75% by weight; and the superposed matter was pressed at a linear pressure of 900 kg/m under heating to 85° C. so that about ½ of the glass beads might be embedded in the support film. Then, the obtained laminate sheet was left alone at ordinary temperature for 4 days so that the crosslinking reaction of the support film might progress by about 40% to give embossing suitability, and, thereafter, the sheet was unwound. Then, the polyethylene laminate paper, i.e., the temporary support, was peeled off so that the glass beads might be transferred onto the support film.

The transfer ratio of the vapor-deposited metal film onto the resultant support film and the performance of the obtained encapsulated lens-type retroreflective sheeting were as shown in the later-described Table 1, and the retroreflective sheeting produced by the production method of the invention was excellent in vividness of color, and, even in the severe weathering test, exhibited only a low lowering ratio of retroreflective performance, was almost free of the peeling of the protective film, and thus had excellent characteristics.

Comparative Example 1

Retroreflective sheeting was produced in all the same manner as in Example 1 except that the coupling agent-containing thin film was not formed.

The transfer ratio of the vapor-deposited metal film onto the resultant support film and the performance of the obtained encapsulated lens-type retroreflective sheeting were as shown in the later-described Table 1, and the retroreflective sheeting was inferior in vividness of color, and, in the weathering test, exhibited a large lowering ratio of retroreflective performance and the peeling of the protective film, and thus had inferior characteristics.

Comparative Example 2

Retroreflective sheeting was produced in all the same manner as in Example 2 except that the acrylic resin solution mixed with the coupling agent in Example 2 was used alone to form a polymer thin film in place of the coupling agent-containing thin film.

The transfer ratio of the vapor-deposited metal film onto the resultant support film and the performance of the obtained encapsulated lens-type retroreflective sheeting were as shown in the later-described Table 1, and the retroreflective sheeting was inferior in vividness of color, and, in the weathering test, exhibited a large lowering ratio of retroreflective performance and the peeling of the protective film, and thus had inferior characteristics.

Further, as to retroreflective performance, the retroreflective sheeting was inferior at the angle conditions of an incident angle of 40° and an observation angle of 0.2°.

Measuring methods on the tests used in Table 1 were as follows.

(1) Average thickness of thin film

The average thickness of a coupling agent-containing thin film or a polymer thin film was calculated according to the following calculation equation.

$$\text{Average thickness of thin film } (\mu m) = \frac{A \times \frac{C}{100}}{B \times D}$$

A: Weight (g) of liquid matter applied
B: Area (m²) of place where liquid matter was applied
C: % by weight of volatilization residue in liquid matter
D: Specific gravity of volatilization residue (2) Evaluation of transfer area ratio of aluminum vapor-deposited metal film onto support film The laminate of the support film and the polyethylene laminate paper as a temporary support left alone at room temperature for a certain period was unwound while peeling the temporary support, and cut out at the spot of about 5 m from the terminal of the unwound roll of the resultant support sheeting to which the glass beads were transferred, and the support film area where glass beads were not embedded and the aluminum vapor-deposited metal film transfer area were determined under a microscope of a magnification of 200-fold using a picture processing apparatus (produced by OLYMPUS OPTICAL CO., LTD., Model VM-30), the transfer area ratio of the aluminum vapor-deposited metal film onto the support film was calculated according to the following equation, and the transfer area ratio was evaluated according to the following criterion.

$$\frac{\text{Aluminum vapor-deposited metal film transfer area}}{\text{Support film area where glass beads were not embedded}} \times 100$$

1: Transfer area ratio of vapor-deposited metal film onto the support film under 1%
2: Transfer area ratio of vapor-deposited metal film onto the support film 1—under 30%
3: Transfer area ratio of vapor-deposited metal film onto the support film 30—under 60%
4: Transfer area ratio of vapor-deposited metal film onto the support film 60—under 90%
5: Transfer area ratio of vapor-deposited metal film onto the support film 90% or more (3) Retroreflective performance The resultant retroreflective sheeting was unwound, and the retroreflective performance of the resultant retroreflective sheeting at the spot of about 5 m from the terminal of the unwound roll was measured according to the reflective performance measurement method described in JIS Z-9117. Angle conditions used were the conditions of an observation angle of 0.2° and an incident angle of 5°, and the conditions of an observation angle of 0.2° and an incident angle of 40°

(4) Vividness of color

The resultant retroreflective sheeting was unwound, and the hue of the retroreflective sheeting at the spot of about 5 m from the terminal of the unwound roll was measured according to the measurement of color described in JIS Z-9117, and the hue was determined by the L*, a* and b* color specification system, and the vividness of color was calculated according to the following calculation equation.

$$\text{Vividness of color} = \sqrt{L^{*2} + a^{*2} + b^{*2}}$$

(5) Lowering ratio of retroreflective performance after Weathering test

The resultant retroreflective sheeting was unwound, and the retroreflective sheeting at the spot of about 5 m from the terminal of the unwound roll was cut into 50 mm×50 mm, the silicone-treated polyethylene terephthalate peeling film was peeled off, and the resultant retroreflective sheeting was stuck on an aluminum panel. The resultant stuck sample was placed in an accelerated weatherometer (produced by Atlas Chemical Industries, Inc., Xenon Weatherometer Type-Ci35A, black panel temperature 80±3° C., spray cycle 18 minutes in 120 minutes), and subjected to a 1,000 hours accelerated weathering test. Thereafter, the stuck sample was taken out, and subjected to a heat shock cycle test using a heat shock cycle tester (produced by TABAI ESPEC CORP., Heat Shock Chamber TSR-63).

As to heat shock cycles, the following condition was made to be 1 cycle, and a 200 cycles test was conducted.

Heat shock cycle condition: −40° C.×30 min→room temperature ×15 min→145° C.×30 min room temperature ×15 min Retroreflective performance (angle conditions: observation angle 0.2°, incident angle 5°) was measured on the stuck sample after the heat shock cycle test, and compared with the retroreflective performance of the specimen before the tests, and the lowering ratio after the weathering tests was calculated according to the following calculation equation.

Retroreflective performance lowering ratio (%) after weathering tests $$= 1 - \left( \frac{\text{Retroreflective perfomance after the tests}}{\text{Retroreflective performance before the tests}} \right) \times 100$$

(6) Peeling of protective film after weathering tests

After the weathering test by the same accelerated weathering test and the heat shock cycle test as described above were conducted, the part where the binding wall binding the protective film to the support film was destroyed, was measured, at the site where destruction of maximum length from the edge was made, and the measured length was defined as protective film peeling.

TABLE 1

| | Average thickness of thin film | Evaluation of transfer area ratio of aluminum vapor-deposited | Retroreflective performance (cd/1 × .m²) | | Vividness of | Lowering ratio of retroreflective performance after weathering | Peeling of protective film after weathering |
|---|---|---|---|---|---|---|---|
| | (μm) | metal film | 0.2°/5° | 0.2°/40° | color | test (%) | test (mm) |
| Example 1 | 0.3 | 1 | 356 | 241 | 63.5 | 0 | 0 |

TABLE 1-continued

|  | Average thickness of thin film ($\mu$m) | Evaluation of transfer area ratio of aluminum vapor-deposited metal film | Retroreflective performance (cd/1 × .m²) 0.2°/5° | Retroreflective performance (cd/1 × .m²) 0.2°/40° | Vividness of color | Lowering ratio of retroreflective performance after weathering test (%) | Peeling of protective film after weathering test (mm) |
|---|---|---|---|---|---|---|---|
| Example 2 | 0.3 | 1 | 333 | 220 | 63.2 | 0 | 0 |
| Example 3 | 0.3 | 1 | 348 | 230 | 63.3 | 0 | 0 |
| Example 4 | 0.3 | 1 | 330 | 218 | 63.0 | 0 | 0 |
| Example 5 | 0.3 | 1 | 332 | 242 | 63.0 | 0 | 0 |
| Comparative example 1 | — | 4 | 346 | 161 | 59.8 | 18 | 2 |
| Comparative example 2 | 0.3 | 5 | 342 | 186 | 60.7 | 6 | 1 |

What is claimed is:

1. A method for producing retroreflective sheeting comprising (1) partially embedding an at least substantial monolayer of glass beads in a thermoplastic resin layer forming at least one surface of a temporary support; (2) vapor depositing a metal over the non-embedded portions of the glass beads and the thermoplastic resin layer in which the glass beads are partially embedded, thereby forming a metal film layer over the exposed surfaces of the glass beads and exposed surfaces of the thermoplastic resin layer of the temporary support; (3) forming a thin film of, or containing, a coupling agent on the metal film layer, said coupling agent being at least one coupling agent selected from the group consisting of silane coupling agents, titanate coupling agents, aluminum coupling agents, and zircoaluminate coupling agents, said thin film containing up to 20 parts of resin per 100 weight parts of the coupling agent, (4) superposing a thermoformable support film over the thin film layer formed in step (3) to form a superposed structure; (5) heat pressing the superposed structure from step (4) to thereby embed the metal layer covered portions of the glass beads in the thermoformable support film; and (6) peeling the temporary support from the thermoformable support film such that the at least substantial monolayer of glass beads with associated metal film layer remains embedded in the thermoformable support film;

whereby after the temporary support and thermoformable support film are separated in step (6) transfer of the portions of metal film layer on the thermoplastic resin layer of the temporary support to the thermoformable support film is substantially prevented.

2. The method according to claim 1 wherein the silane coupling agent is a compound represented by the general formula wherein $X^1$ represents a hydrolyzable group, $Y^1$ represents an organic functional group reacting with an organic matrix, $Z^1$ represents a nonhydrolyzable group, $R^1$ is a single bond or an alkylene group, preferably an n-propylene group, and n is 2 or 3.

3. The method according to claim 1 wherein the titanate coupling agent is a compound represented by the general formula wherein $X^2$ represents a hydrolyzable group, $Y^2$ represents an organic group having affinity for or reactivity with an organic matrix, and p is 0.5 to 2, or a compounds represented by the general formula wherein $X^3$ represents a hydrolyzable group, $Y^3$ represents an organic group having affinity for or reactivity with an organic matrix, $Z^2$ represents an alkoxy group, a substituted alkoxy group, an aryloxy group, an aralkyloxy group, or a haloalkoxy group or a haloaryloxy group, and m is 0 to 4.

4. The method according to claim 1 wherein the aluminum coupling agent is a compounds, represented by the general formula wherein $X^4$ represents a hydroxyl group or a hydrolyzable group, $Y^4$ represents an organic group having affinity for or reactivity with an organic matrix, $Z^3$ represents an alkyl group, an aryl group or the like, $Z^4$ represents an alkyl group, an alkoxy group or an alkenyloxy group, or a substituted amino group, and q is 0.5 to 2.

5. The method according to claim 1 wherein the zircoaluminate coupling agent is a compound represented by the general formula wherein $Y^5$ represents an organic group having affinity for or reactivity with an organic matrix, and $R^2$ represents a single bond or an alkylene group of $C_1$ to $C_{18}$.

6. The method according to claim 1 wherein the coupling agent is a silane coupling agent.

7. The method according to claim 6 wherein the silane coupling agent is selected from the group consisting of 3-chloropropyltrimethoxysilane, 3-methacryloyloxypropyltrimethoxysilane, 3-glycidoxypropyltrimethoxysilane, 3-mercaptopropyltrimethoxysilane, 3-aminopropyltrimethoxysilane, N-methyl-3-aminopropyltrimethoxysilane, N-(2-aminoethyl)-3-aminopropyltrimethoxysilane, N-[2-(N-2-aminoethyl)aminoethyl]-3-aminopropyltrimethoxysilane, 3-ureidopropyltrimethoxysilane, N-phenyl-3-aminopropyltrimethoxysilane, 3-(4,5-dihydroimidazolyl)propyltrimethoxysilane, 3-aminopropyltris(2-methoxy-2-ethoxyethoxy)silane, N-(2-aminoethyl)-3-aminopropylmethyldimethoxysilane, 3-chloropropylmethyldimethoxysilane, 3-methacryloyloxypropylmethyldimethoxysilane, 3-mercaptopropylmethyldimethoxysilane, 3-glycidoxypropylmethyldimethoxysilane, 3-chloropropylmethyldiethoxysilane, 3-aminopropylmethyldiethoxysilane, 2-(3,4-epoxycyclohexyl)ethyltrimethoxysilane, vinyltrimethoxysilane, vinyltriethoxysilane, 3-chloropropyltriethoxysilane, 3-mercaptopropyltriethoxysilane, 3-aminopropyltriethoxysilane, 3-ureidopropyltriethoxysilane, 3-cyanopropyltriethoxysilane, vinyltris(2-methoxyethoxy)silane, vinyltriacetoxysilane, vinyltrichlorosilane, 3-chloropropylmethyldichlorosilane, octadecyl[3-(trimethoxysilyl)propyl] ammonium chloride and N-[2-(N-vinylbenzyl)aminoethyl]-3-aminopropyltrimethoxysilane hydrochloride.

8. The method according to claim 1 wherein the thin film containing the coupling agent is one containing 0.01 to 20 weight parts of a resin per 100 weight parts of the coupling agent.

9. The method according to claim 1 wherein the thin film containing the coupling agent is one containing 0.05 to 15 weight parts of a resin per 100 weight parts of the coupling agent.

10. The method according to claim 8 wherein the resin is at least one resin selected from the group consisting of an acrylic resin, a polyester resin, a polyurethane resin and a fluorine-containing resin.

11. The method according to claim 1 wherein the average thickness of the thin film containing the coupling agent is 0.01 to 5 $\mu$.

12. The method according to claim 1 wherein the average thickness of the thin film containing the coupling agent is 0.05 to 3 $\mu$.

13. The method according to claim 1 wherein the thin film containing the coupling agent is formed by applying liquid matter containing the coupling agent.

14. The method according to claim 13 wherein the viscosity of the liquid matter is in the range of 1 to 1,000 cP.

15. Retroreflective sheeting produced by the method according to claim 1.

16. The method of claim 1 which further comprises, following step (6), (7) superposing a light-transmissive protective film over the exposed, non-embedded portions of the glass beads in the resulting support film and partially thermally deforming the support film to form a large number of sealed, small compartment cells, between the support film and the protective film and surrounded by continuous, linear walls which bind the support film and protective film to each other.

17. Retroreflective sheeting produced by the method of claim 16.

* * * * *